(No Model.)
A. B. HACKMAN.
WIRE GATE.
No. 344,372. Patented June 29, 1886.
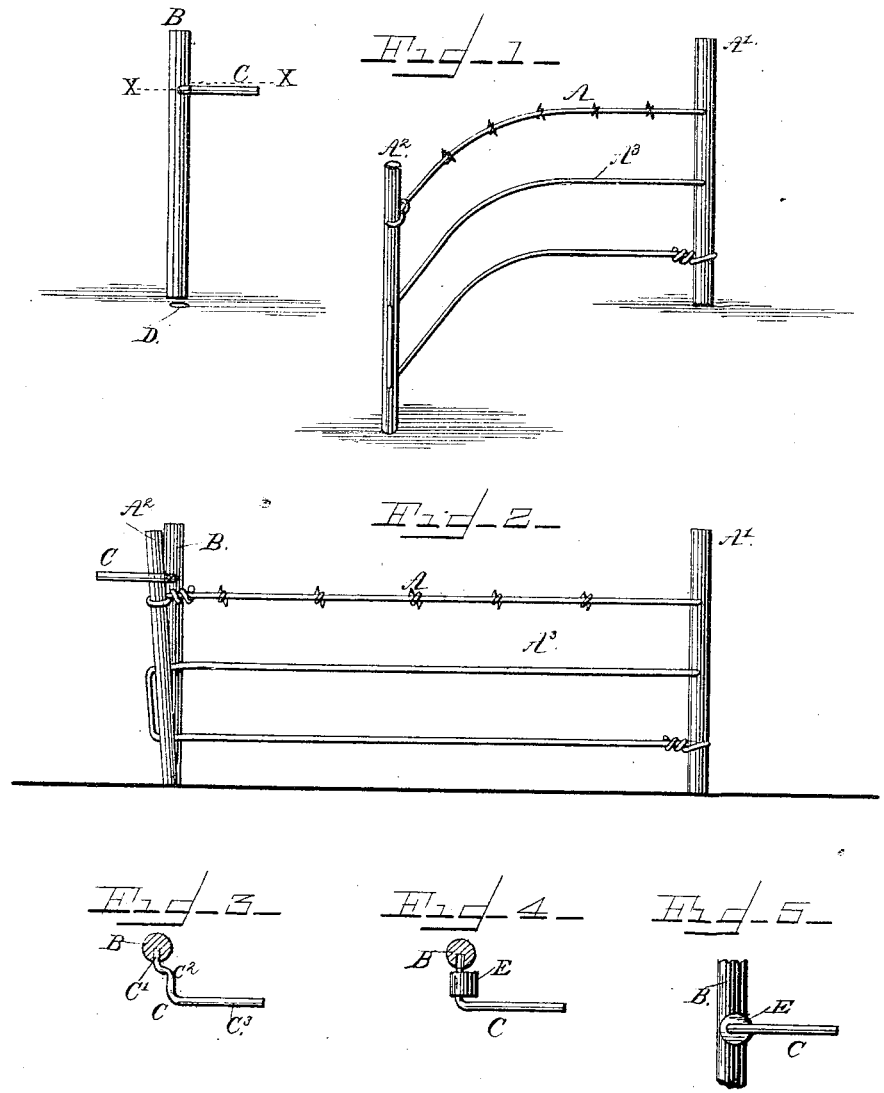
WITNESSES
R. W. Bishop.
G. P. Kramer.
Aaron B. Hackman
INVENTOR
By R. S. & A. P. Lacey
Attorneys.

UNITED STATES PATENT OFFICE.

AARON B. HACKMAN, OF PENROSE, ILLINOIS.

WIRE GATE.

SPECIFICATION forming part of Letters Patent No. 344,372, dated June 29, 1886.

Application filed March 26, 1886. Serial No. 196,683. (No model.)

*To all whom it may concern:*

Be it known that I, AARON B. HACKMAN, a citizen of the United States, residing at Penrose, in the county of Whiteside and State of Illinois, have invented certain new and useful Improvements in Wire Gates; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to gates for wire fences, and it aims to provide a cheap and simple gate, as shown in the accompanying drawings; and it consists, essentially, in a lever provided with an eccentric portion for closing the gate and holding it in its closed position, as will be hereinafter fully described, and pointed out in the claim.

In the annexed drawings, Figure 1 is a front elevation showing my gate open. Fig. 2 shows it closed. Fig. 3 is a detail sectional view on the line $x\ x$, Fig. 1; and Figs. 4 and 5 are detail views showing a modification.

A designates the gate, which is of a very simple construction. It consists of two posts, A' A², and a wire, A³, secured to and connecting the two posts. The post A' is immovable, its lower end entering the ground to a sufficient depth to secure the post, as will be understood. The post A² is movable, and is connected to the post A' in the manner I will now describe. One end of the wire A³ is fastened around the post A² near its upper end, and at a suitable distance therefrom. The wire is then carried to the post A' and inserted through an opening formed through the said post. It is then bent downward to about the middle of the post and passed through a second opening back toward the post A². It is then carried to the post A² and inserted through openings in said post in opposite directions in the manner just described of passing and repassing it through the post A', after which it is carried back to the post A', and secured thereto near its lower end in any desired manner. It will thus be seen that I provide a gate which can be built with very little labor, in a very short space of time, and, owing to the small number of parts used and the simplicity of their construction, at a very slight cost.

Barb-wire may be substituted for the plain wire shown in the drawings, where so desired.

The gate is closed by locking it to a post, B, set in the ground at a suitable distance from the post A'. The wire A³ is made of such a length that the gate will be about equal in length to the distance between the two posts A' and B. Near the upper end of the post B, I pivotally secure a lever, C, which closes the gate and holds it in its closed position in the operation of the same. This lever C, I preferably form of a single metal rod, as shown in Figs. 1, 2, and 3. One end, C', is inserted in the post B, and in such a manner that it will be allowed to turn freely, but cannot be readily removed from the post. The rod C is given a double bend close to the post, and a third bend a proper distance from the post, so as to form the crank C² and the handle C³.

D is a hole made in the ground close to the lower end of the post B, the purpose of which will presently appear.

The operation of my gate is simple and will be readily appreciated. In Fig. 1 the gate is shown partially open. To close the gate, the lower end of the post A² is set in the hole D and the post A² held close to the post B. The lever C is then turned downward, when the crank portion C² will be caused to bear against the post A² and carry it forward. The lever C is given a half-revolution, which will bring it into the position shown in Fig. 2, closing the gate. The lever is so constructed that it will bind against the post A² sufficiently to hold the gate against the tension of the wire, and will hold the gate in its closed position. To open the gate it is only necessary to reverse the operation just described.

The peculiar construction of the gate shown and described is particularly advantageous, as by the arrangement of the wire A³ the gate can be easily stretched so as to hold the wire taut.

While I prefer to use the peculiar form of lever shown most clearly in Fig. 3, and hereinbefore described, I do not wish to be limited thereto in building my gate. Where so desired the analogous construction shown in Figs.

4 and 5 could be used without departing from the principles of my invention. In Figs. 4 and 5 I have shown the lever G as an ordinary L-shaped lever, the shorter arm being pivotally secured in the post B, and provided with an eccentric, E. It will be seen that this construction will have the same operation as that shown in Figs. 1, 2, and 3. I prefer, however, to use the first-mentioned, as it is cheaper and simpler.

I am aware that a wire gate has been drawn taut and held closely by a horizontally-swinging latch-lever pivoted to a post on one side of the gateway, and do not claim such as my invention.

Having thus described my invention, what I claim, and desire to secure by Letters Patent, is—

The combination, with the gate, comprising a fixed and movable post and wire connecting the two posts, of a second post located at a distance from the fixed post of the gate on the opposite side of the gateway, forming a stop for the movable post, and a substantially right-angled lever having the shorter arm journaled in the fixed post and provided with an eccentric or crank to bear on the inner side of the movable gate-post and draw the gate taut, the longer arm bearing on the outer side of said post to hold it close against the fixed post, substantially as and for the purpose described.

In testimony whereof I affix my signature in presence of two witnesses.

AARON B. HACKMAN.

Witnesses:
J. K. ESHLEMAN,
MATT. E. WILLGER, Jr.